United States Patent [19]

Chen

[11] Patent Number: 5,702,197
[45] Date of Patent: Dec. 30, 1997

[54] STRUCTURE OF PIVOT JOINT

[75] Inventor: Guei-Rung Chen, Hsin Chuang, Taiwan

[73] Assignee: Chih Ching Industry Ltd., Hsin Chuang, Taiwan

[21] Appl. No.: 673,090

[22] Filed: Jul. 1, 1996

[51] Int. Cl.$^6$ ............... F16B 7/10; F17C 11/00; H05K 7/00

[52] U.S. Cl. ............... 403/166; 403/91; 403/84; 16/342; 361/681

[58] Field of Search ............... 403/65, 66, 68, 403/120, 111, 103, 84, 83, 112, 119, 87, 73, 91, 110, 166; 16/342, 340; 361/681, 682; 248/291.1; 411/531, 534, 537, 538, 547

[56] References Cited

U.S. PATENT DOCUMENTS

| | | | |
|---|---|---|---|
| 5,208,944 | 5/1993 | Lu | 16/340 |
| 5,239,731 | 8/1993 | Lu | 16/340 |
| 5,269,047 | 12/1993 | Lu | 16/340 |

*Primary Examiner*—Kenneth J. Dorner
*Assistant Examiner*—William L. Miller
*Attorney, Agent, or Firm*—Mortn J. Rosenberg; David I. Klein; Jun Y. Lee

[57] ABSTRACT

A pivot joint including a pivot bolt, which has an elongated flat mounting rod section at one end, a screw rod section at an opposite end, which has two longitudinal planes at two opposite sides, and a collar between in the middle, a mounting frame rotatable about the screw rod section, a lock nut in threaded engagement with the screw rod section, a first packing ring mounted around the screw rod section between the mounting frame and the collar, a second packing ring mounted around the screw rod section between the mounting frame and the lock nut, a locating ring mounted around the screw rod section between the second packing ring and the lock nut and rotatable by the pivot bolt relative to the mounting frame, reversed sets of disk-like spring rings mounted around the screw rod section between the locating ring and the lock nut, and a washer mounted around the screw rod section between the spring rings and the lock nut, wherein the second packing ring has a curved flange abutting the locating ring so that the second packing ring and the locating ring are connected through a line contact.

4 Claims, 7 Drawing Sheets

STRUCTURE OF PIVOT JOINT

BACKGROUND OF THE INVENTION

The present invention relates to an improved structure of pivot joint for connecting two parts of a palm-top computer, notebook computer, container, etc. which is durable in use, positive and smooth in operation.

Various pivot joints are well known and intensively used in mobile computers and containers, allowing two parts to be pivoted to each other and positioned at a desired angular position relative to each other. However, regular pivot joints will wear quickly with use, causing a positioning error.

FIG. 1 shows a pivot joint according to the prior art for connection between the display unit of a mobile (notebook) computer and the mainframe and keyboard unit thereof. This structure of pivot joint comprises a pivot bolt (41), a locating ring plate (42), a torsional spring (43), and a mounting frame (40). The locating ring plate (42) has a projecting portion (420). Under normal condition, the torsional spring (43) forces the projecting portion (420) of the locating ring plate (42) in one direction, causing the pivot bolt (41) retained at an angle relative to the mounting frame (40). When the mobile computer is closed, a lock is locked to hold down the mobile computer in the closed position. When the lock is unlocked, the torsional spring (43) immediately returns to its former shape, causing the mobile computer retained in the open position. The main drawback of this structure of pivot joint is that it does not allow the angular position of the display unit of the mobile computer to be freely adjusted relative to the mainframe and keyboard unit.

U.S. Pat. No. 5,269,047 discloses another structure of pivot joint. As illustrated in FIG. 2, this structure of pivot joint comprises a mounting frame (10) for fastening to the mainframe and keyboard unit, a pivot bolt (20) for fastening to the display unit, a lock nut (16) threaded onto the threads 201 of the pivot bolt (20) to hold the pivot bolt (20) and the mounting frame (100) together, two packing rings (12 and 13) mounted around the pivot bolt (20) and abutting the pivot hole (11) of the mounting frame (10) at two opposite sides, a plurality of dish-like plate springs (14) mounted around the pivot bolt (20) and retained between one packing ring (12) and the lock nut (16), and a locating plate (15) mounted around the pivot bolt (20) and retained between the disk-like plate springs (14) and the lock nut (16) and having a projecting rod (151). The packing rings (12 and 13) have a plurality of lubricating holes (120 and 130). The mounting frame (10) has oil notches (110) around the pivot hole (11) for passing the lubricating grease. This structure of pivot joint has drawbacks. It must be regularly lubricated so that the parts can be moved relative to one another smoothly. However, the result of the application of a lubricating grease to the parts of the pivot is still not satisfactory because the lubricating grease will become dried quickly when it is disposed in contact with air. When the lubricating grease is dried, the packing rings become firmly attached to the mounting frame, and the parts will rub against one another heavily when the pivot bolt is rotated relative to the mounting frame. Therefore, this structure of pivot joint wears quickly with use.

U.S. Pat. No. 5,208,944 discloses still another structure of pivot joint. This structure of pivot joint, as illustrated in FIG. 9, comprises a pivot bolt (1) fastened to the display unit of the mobile computer (not shown), and a mounting frame (3) fastened to the mainframe and keyboard unit of the mobile computer. The pivot bolt has a collar (10) with an oil groove (11) in the middle and a shaft (12) at one end. The shaft (12) of the pivot bolt (1) terminates in a flat rod section (14) having threads (13). The shaft (12) of the pivot bolt (1) is inserted in proper order through a first packing ring (22), the pivot hole (30) on the mounting frame (3), a second packing ring (24), two reversed, disk-like plate springs (4), a socket (5), a torsional spring (6), the center through hole (70) of a locating plate (7), and then in threaded engagement with a lock nut (8). The packing rings (22) have oil holes (21) for the passing of the lubricating grease and for the dissipation of heat. The mounting frame (3) has an extension wall (32) and a hook hole (34) on the extension wall (34). The torsional spring (6) is mounted around the socket (5) having one end (61) fastened to the locating plate (7) and an opposite end fastened to the hook hole (34) of the extension wall (32) of the mounting frame (3). The socket (5) has an oil groove (51) (not shown) on the inside. The locating plate (7) has a rectangular mounting through hole (70), which receives the flat rod section (14) of the shaft (12) of the pivot bolt (1), and a substantially L-shaped flange (72) connected to the opposite end of the torsional spring (6). This structure of pivot joint still cannot eliminate the drawbacks of the pivot joint disclosed in U.S. Pat. No. 5,269,047.

SUMMARY OF THE INVENTION

The present invention has been accomplished under the circumstances in view. It is one object of the present invention to provide a pivot joint which meets the requirements for repeated turning over thirty thousands of cycles (180° back and forth). It is another object of the present invention to provide a pivot joint which does not wear away with use quickly. It is still another object of the present invention to provide a pivot joint which can be firmly retained in any desired angular position. It is still another object of the present invention to provide a pivot joint which is smooth and stable in use.

According to one one embodiment of the present invention, the pivot joint comprises a pivot bolt, which has an elongated flat mounting rod section at one end, a screw rod section at an opposite end, which has two longitudinal planes at two opposite sides, and a collar between in the middle, a mounting frame rotatable about the screw rod section, a lock nut in threaded engagement with the screw rod section, a first packing ring mounted around the screw rod section between the mounting frame and the collar, a second packing ring mounted around the screw rod section between the mounting frame and the lock nut, a locating ring mounted around the screw rod section between the second packing ring and the lock nut and rotatable by the pivot bolt relative to the mounting frame, reversed sets of disk-like spring rings mounted around the screw rod section between the locating ring and the lock nut, and a washer mounted around the screw rod section between the spring rings and the lock nut, wherein the second packing ring has a curved flange abutting the locating ring so that the second packing ring and the locating ring are connected through a line contact.

According to another embodiment of the present invention, the first packing ring has a curved flange abutting the mounting frame so that the first packing ring and the mounting frame are connected through a line contact.

DETAILED DESCRIPTION OF THE PREFERRED EMBODIMENT

Figure 1:
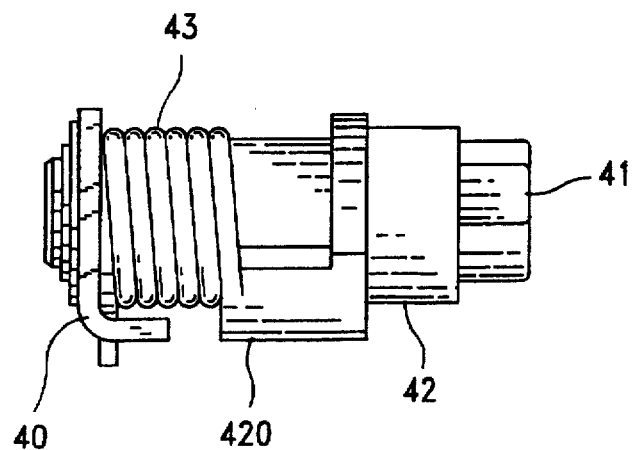
FIG. 1 is an elevational view of a pivot joint according to the prior art.
Figure 2:
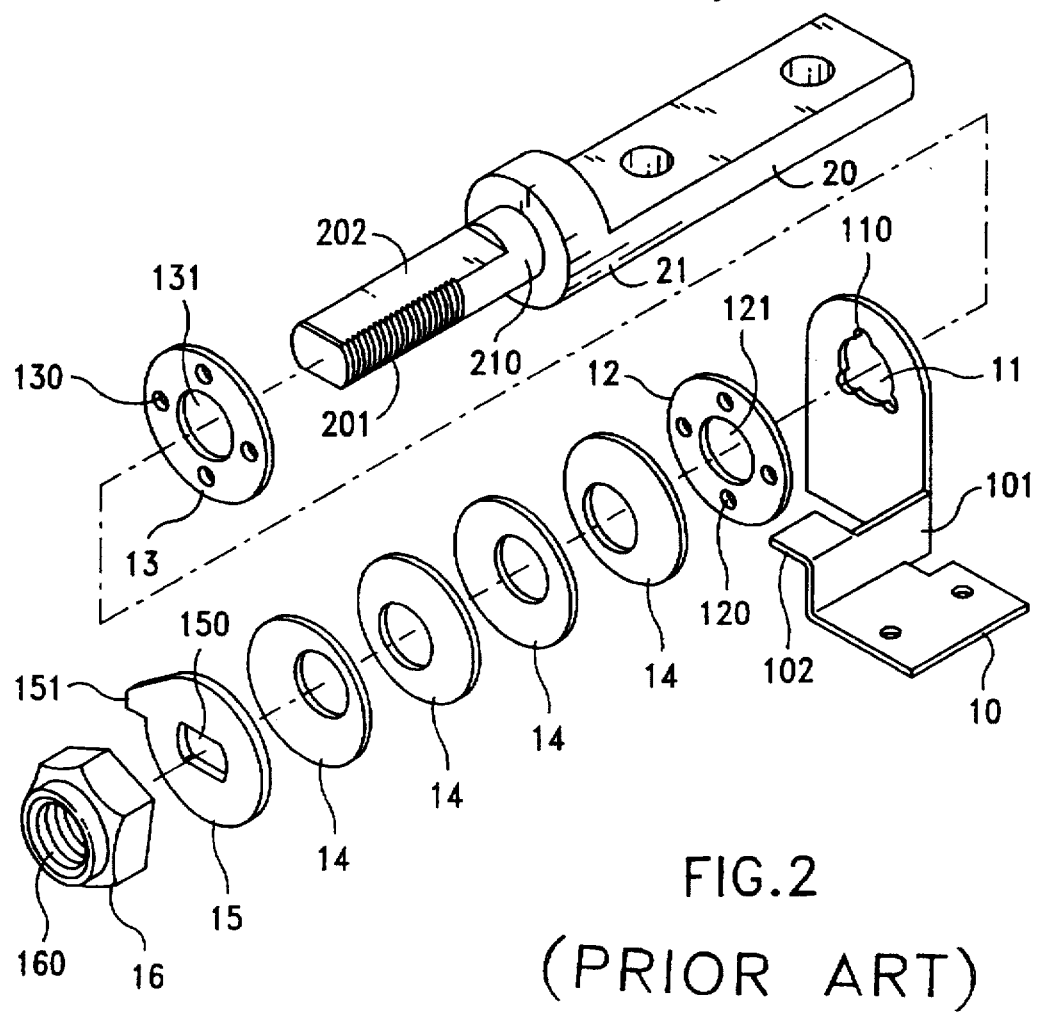
FIG. 2 is an exploded view of a pivot joint according to U.S. Pat. No. 5,269,047.

Referring to FIGS. 2 through 8, a pivot joint in accordance with the present invention is generally comprised of a pivot bolt 50, and a mounting frame 56 for fastening to the display unit and the mainframe and keyboard unit of a mobile computer (not shown). The pivot bolt 50 comprises an elongated flat mounting rod section 51 at one end, a screw rod section 53 at an opposite end, which has two longitudinal planes 61 and 62 at two opposite sides, and a collar 52 in the middle between the flat mounting rod section 51 and the screw rod section 53 (see FIGS. 3, 6, and 7).

The screw rod section 53 of the pivot bolt 50 is inserted in proper order through a flat packing ring 55, a pivot hole 63 on the mounting frame 56, a flanged packing ring 54, the square through hole 64 on a locating ring 58, two reversed sets of disk-like ring plates 59, and a washer 60, and then in threaded engagement with a lock nut 70. The planes 61 and 62 of the screw rod section 53 of the pivot bolt 50 are engaged with the periphery of the square through hole 64 of the locating ring 58. Therefore, the locating ring 58 is rotated with the pivot bolt 50 against the reversed sets of disk-like ring plates 59 and the flanged packing ring 54 when the pivot bolt 50 is rotated relative to the mounting frame 56. This arrangement prevents the disk-like ring plates 59 from rubbing against one another during the relative movement between the pivot bolt 50 and the mounting frame 56. The flanged packing ring 54 has a curved flange A at one side abutting at one side of the locating ring 58. Therefore, the flanged packing ring 54 and the locating ring 58 are connected through a line contact. When dust enters the gap between the flanged packing ring 54 and the locating ring 58, it will be guided to space B, and therefore the friction resistance between the flanged packing ring 54 and the locating ring 58 can be reduced.

Figure 3:
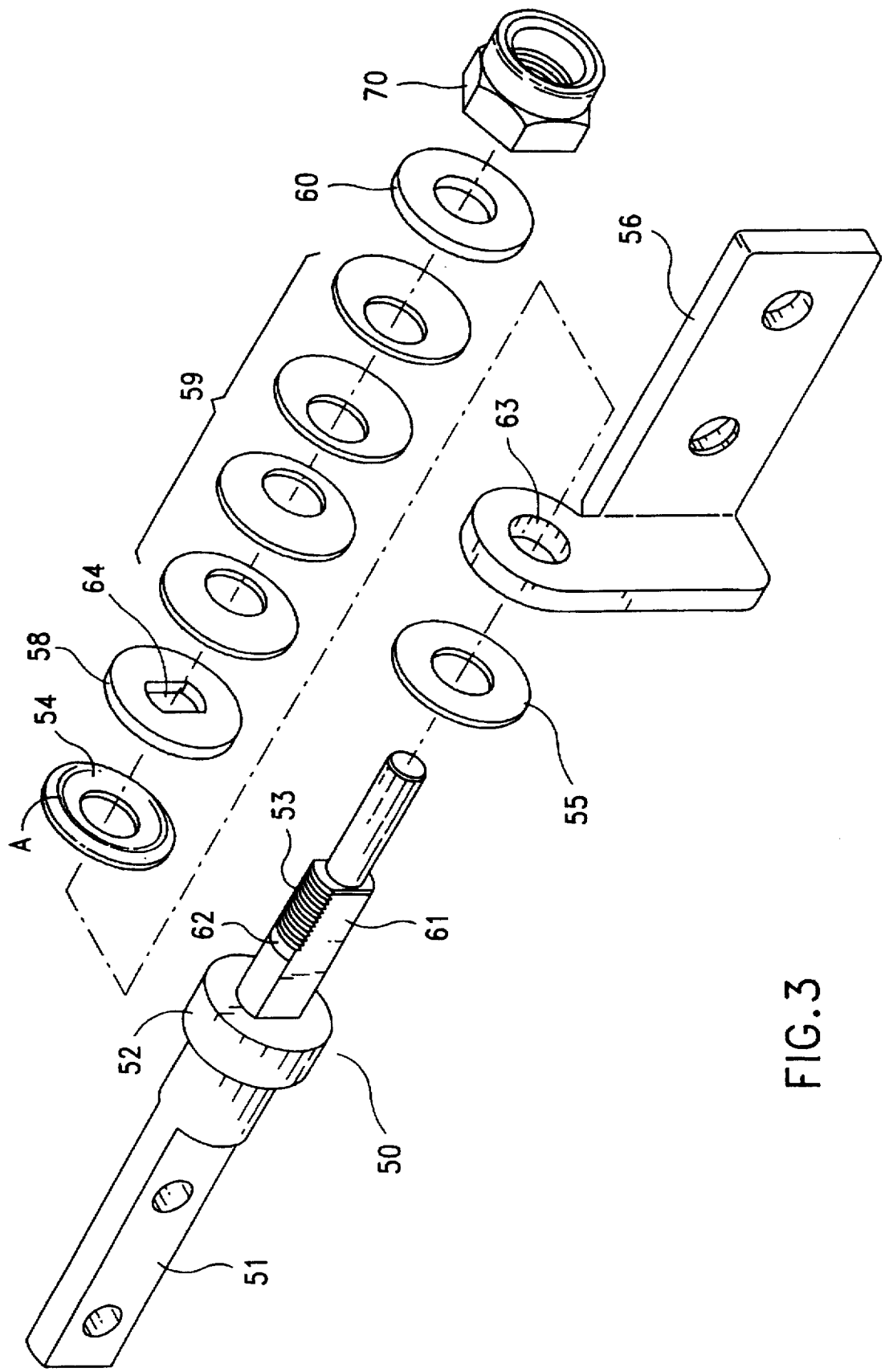
FIG. 3 is an exploded view of a pivot joint according to the present invention.
Figure 3A:
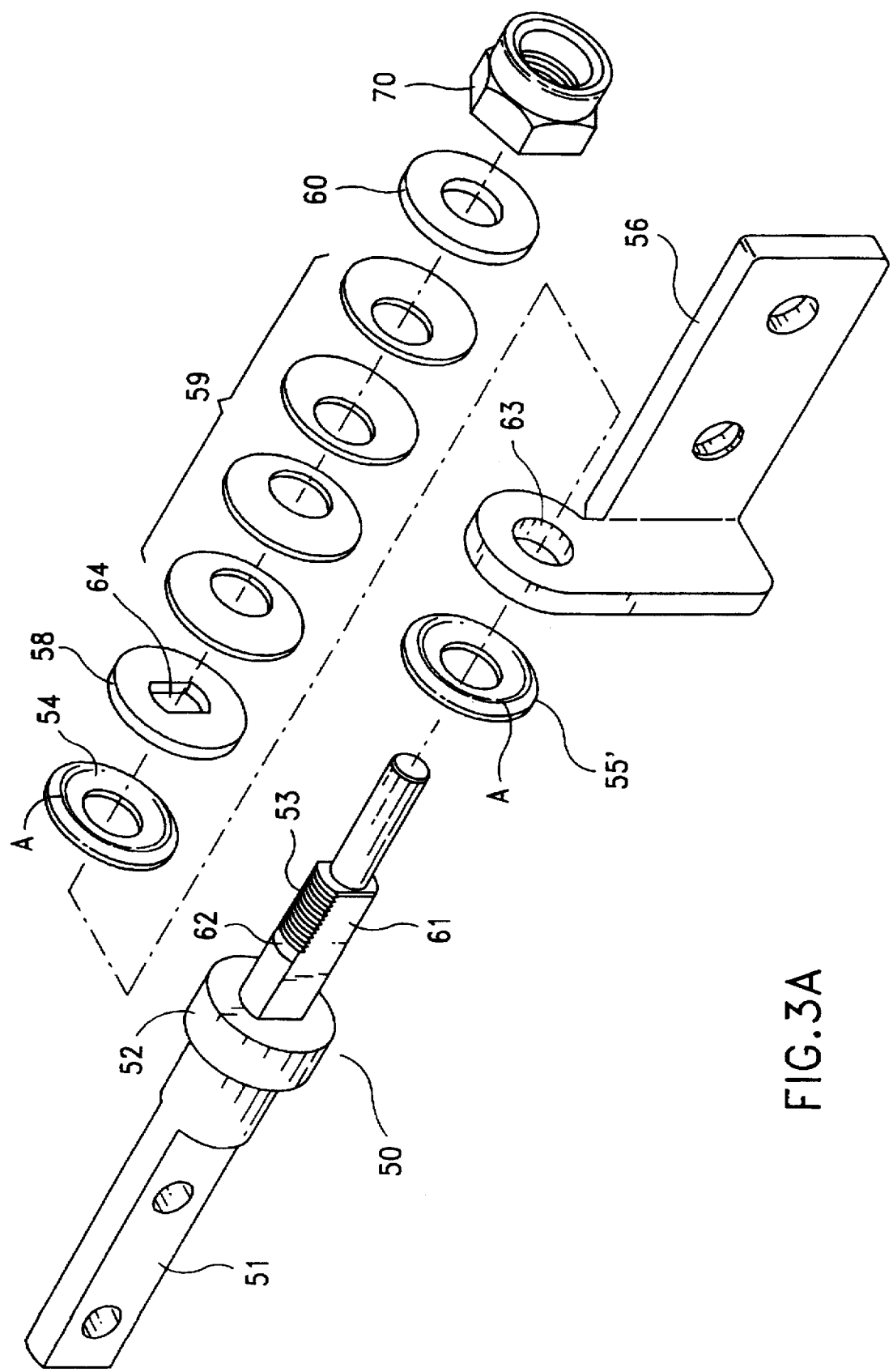
FIG. 3A is an exploded view of an alternate form of the present invention.
Figure 4:
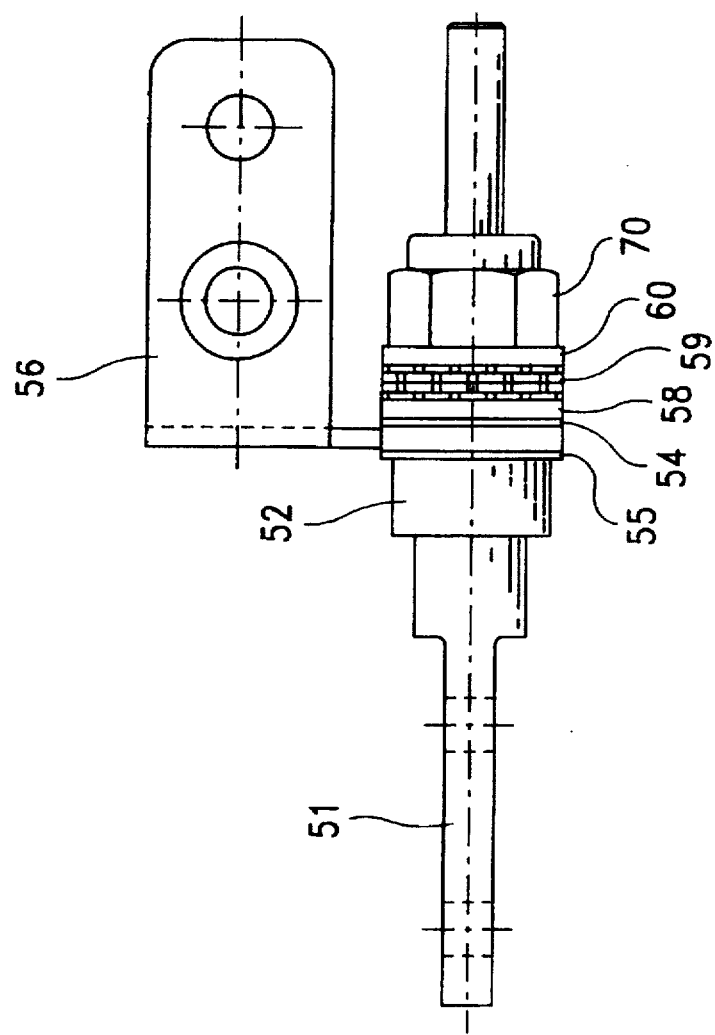
FIG. 4 is a side view of the pivot joint shown in FIG. 3.
Figure 5:
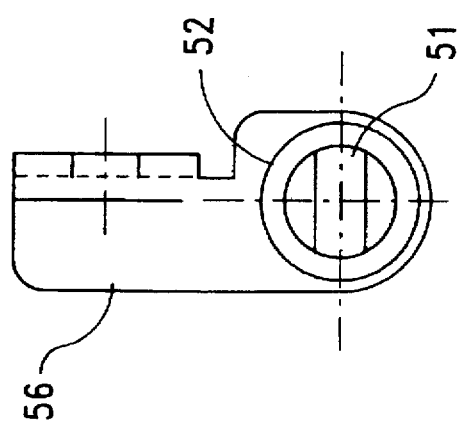
FIG. 5 is an end view of FIG. 5.
Figure 6:
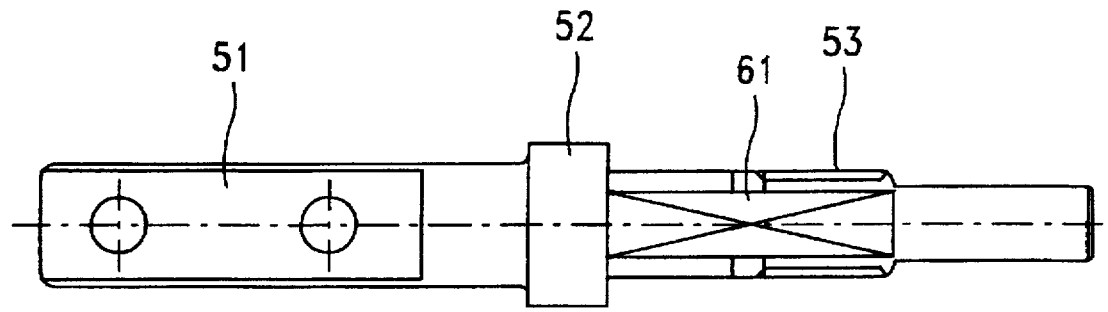
FIG. 6 is a bottom view of the pivot bolt shown in FIG. 3.
Figure 7:
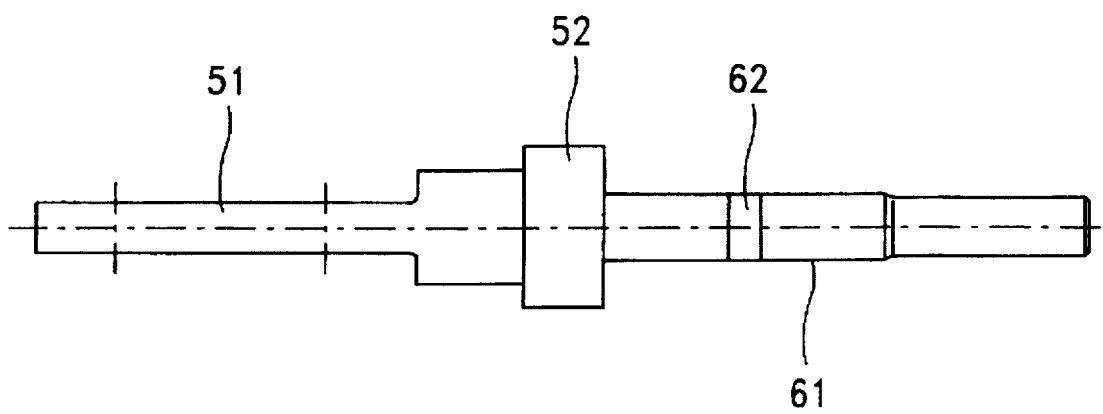
FIG. 7 is a front view of FIG. 6.
Figure 8:
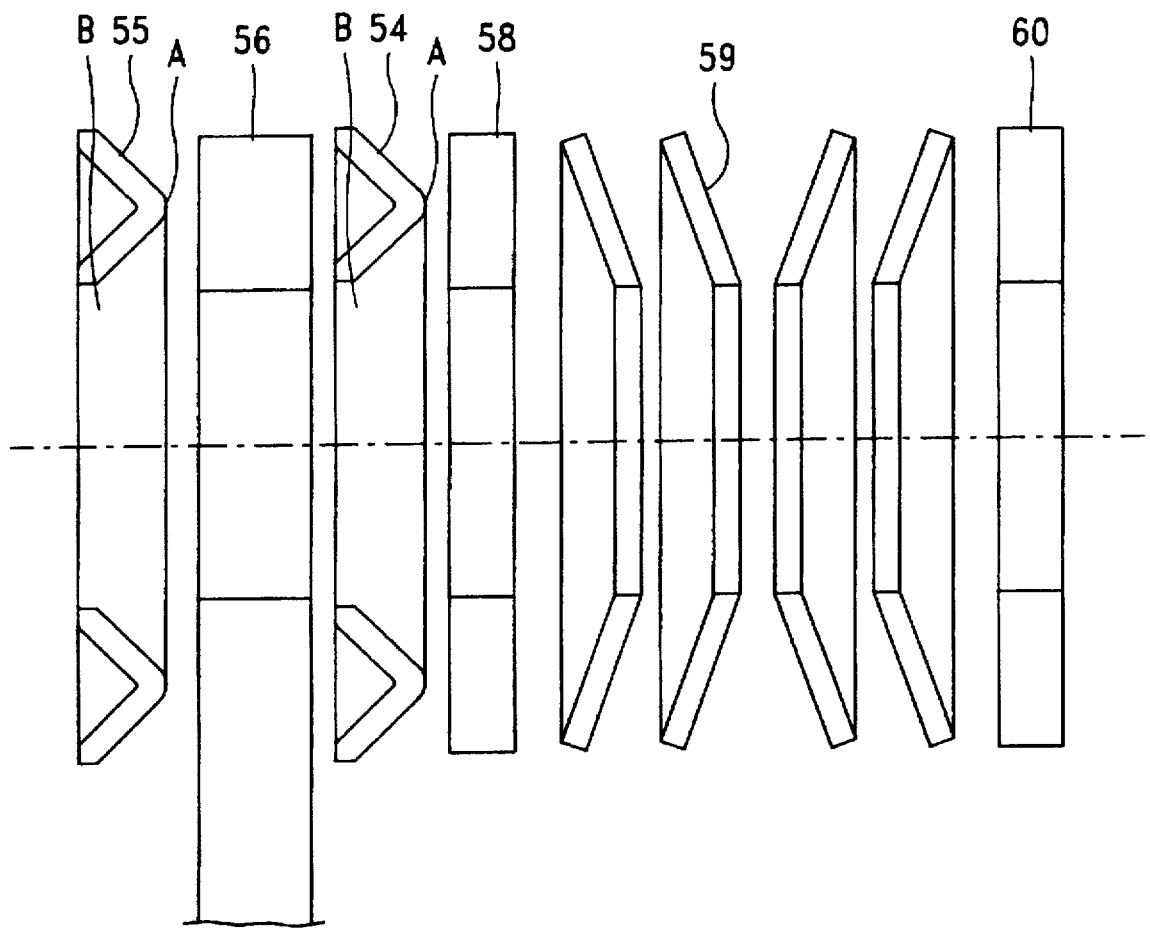
FIG. 8 is a schematic drawing showing the operation of the present invention.
Figure 9:
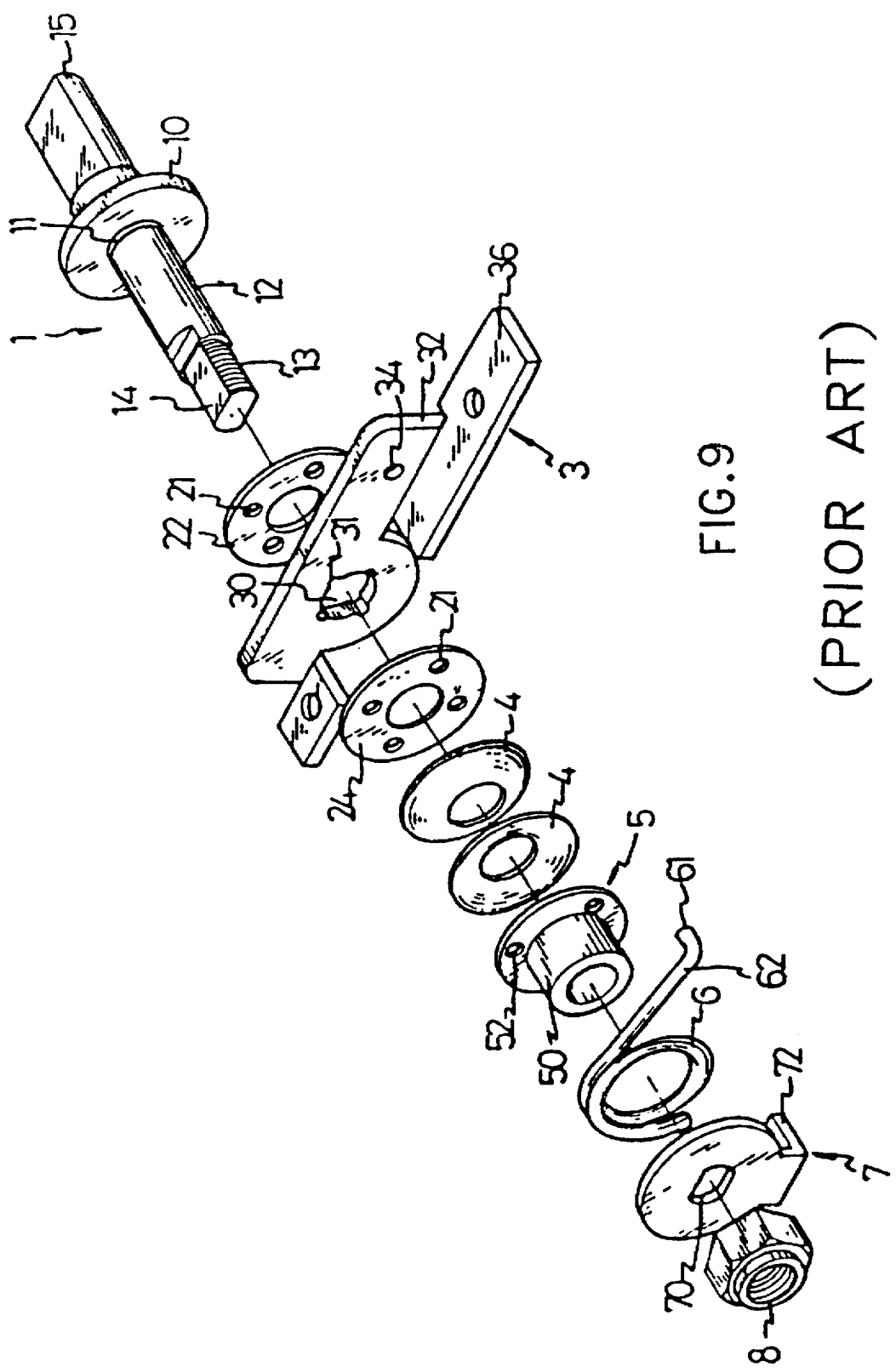
FIG. 9 is an exploded view of a pivot joint according to U.S. Pat. No. 5,208,944.

FIG. 3A shows an alternate form of the present invention, in which a flanged packing ring 55' of structure similar to the flanged packing ring 54 of FIG. 3 is used to replace the aforesaid flat packing ring 55.

What is claimed is:

1. A pivot joint comprising a pivot bolt having an elongated flat mounting rod section at one end, a screw rod section at an opposite end, said screw rod section having two longitudinal planes at two opposite sides, and a collar between said flat mounting rod section and said screw rod section, a mounting frame rotatable about said screw rod section, a lock nut in threaded engagement with said screw rod section, a first packing ring mounted around said screw rod section and disposed between said collar and said mounting frame, a second packing ring mounted around said screw rod section and disposed between said mounting frame and said lock nut, a locating ring mounted around said screw rod section and disposed between said second packing ring and said lock nut and rotatable by said pivot bolt relative to said mounting frame, a plurality of spring members mounted around said screw rod section and disposed between said locating ring and said lock nut, and a washer mounted around said screw rod section and disposed between said spring members and said lock nut, said second packing ring having a curved flange at one side abutting said locating ring, said locating ring having a rectangular through hole engaged with said longitudinal planes of said screw rod section.

2. The pivot joint of claim 1 wherein said second packing ring and said locating ring are connected through a line contact.

3. The pivot joint of claim 1 wherein said spring members include reversed sets of disk-like ring plates mounted around said screw rod section and disposed between said locating ring and said lock nut.

4. The pivot joint of claim 1 wherein said first packing ring has a curved flange at one side abutting said mounting frame.

* * * * *